(12) United States Patent
Valentin

(10) Patent No.: US 6,484,674 B2
(45) Date of Patent: Nov. 26, 2002

(54) FREE-PISTON INTERNAL COMBUSTION ENGINE

(76) Inventor: Ingo Valentin, 14900 Westover Rd., Elm Grove, WI (US) 53122

( * ) Notice: Subject to any disclaimer, the term of this patent is extended or adjusted under 35 U.S.C. 154(b) by 0 days.

(21) Appl. No.: 09/962,017

(22) Filed: Sep. 25, 2001

(65) Prior Publication Data
US 2002/0023598 A1 Feb. 28, 2002

Related U.S. Application Data

(62) Division of application No. 09/408,046, filed on Sep. 29, 1999, now Pat. No. 6,293,231.

(51) Int. Cl.$^7$ .............................. F02B 71/00; F02B 3/00
(52) U.S. Cl. ..................................... 123/46 R; 123/299
(58) Field of Search ................................ 123/299, 300, 123/46 R, 470, 305

(56) References Cited

U.S. PATENT DOCUMENTS

| | | | |
|---|---|---|---|
| 2,805,654 A | 9/1957 | Jacklin | |
| 3,606,591 A | 9/1971 | Potma | |
| 4,048,970 A | 9/1977 | Fitzgerald | |
| 4,308,720 A | 1/1982 | Brandstadter | |
| 4,382,748 A | 5/1983 | Vanderlaan | |
| 4,415,313 A | 11/1983 | Bouthors et al. | |
| 4,530,317 A * | 7/1985 | Schutten | 123/46 R |
| 4,541,243 A | 9/1985 | Clark | |
| 4,589,380 A | 5/1986 | Coad | |
| 4,637,209 A | 1/1987 | Clark | |
| 4,776,166 A | 10/1988 | Dixon | |
| 4,790,270 A | 12/1988 | McKay et al. | |
| 4,873,822 A | 10/1989 | Benaroya | |
| 4,876,991 A | 10/1989 | Galitelli, Jr. | |
| 4,891,941 A | 1/1990 | Heintz | |
| 4,924,828 A * | 5/1990 | Oppenheim | 123/299 |
| 5,036,667 A | 8/1991 | Thatcher | |
| 5,167,292 A | 12/1992 | Moiroux et al. | |
| 5,261,797 A | 11/1993 | Christenson | |
| 5,269,280 A * | 12/1993 | Braun et al. | 123/46 R |
| 5,287,827 A * | 2/1994 | Almendinger et al. | 123/46 R |
| 5,327,857 A | 7/1994 | Howell | |
| 5,345,906 A * | 9/1994 | Luczak | 123/299 |

(List continued on next page.)

FOREIGN PATENT DOCUMENTS

DE 952042 7/1949

Primary Examiner—Thomas N. Moulis
(74) Attorney, Agent, or Firm—Reinhart Boerner Van Deuren s.c.

(57) ABSTRACT

An internal combustion free-piston pump-engine provides pressurized fluid for a hydrostatic powertrain. The free-piston is reciprocably mounted in a piston bore and transfer combustion pressure directly into pressurized hydraulic fluid. Fast, computer controlled hydraulic two-way valves initiate the stepwise pressurization of the smaller face, the larger face, or both faces of the hydraulic end of the free-piston, controlling the piston movement and especially its top-end and bottom end positions. The control concept can be applied to a two-stroke, or four-stroke compression or spark ignition engine. A pressure wave charger, transfers the energy of the exhaust pressure wave into an air intake pressure wave. A cylindrical piston is reciprocally mounted in a piston bore of a housing. The exhaust pressure wave moves the piston from the top-end position to the bottom-end position, against the pressure of the intake air and the force of a return spring. The spring returns the piston back to the top-end position, with the support of collapsing exhaust pressure, after the charger piston releases the exhaust before reaching the bottom-end position. A fuel injector apparatus includes a fuel pump, a fuel accumulator/common rail, an injector valve and an injector ring assembly with injection nozzles at the inner circumference. The oscillating fuel pump piston converts hydraulic pressure directly into pressurized fuel. The nozzles are manufactured into the axial face of a first ring, covered and sealed by means of a second ring of the assembly.

19 Claims, 10 Drawing Sheets

U.S. PATENT DOCUMENTS

| | | |
|---|---|---|
| 5,355,676 A | 10/1994 | Inokuchi |
| 5,461,859 A | 10/1995 | Beale et al. |
| 5,464,331 A | 11/1995 | Sawyer |
| 5,473,893 A | 12/1995 | Achten et al. |
| 5,556,262 A | 9/1996 | Achten et al. |
| 5,601,067 A | 2/1997 | Wirbeleit et al. |
| 5,605,134 A | 2/1997 | Martin |
| 5,616,010 A | 4/1997 | Sawyer |
| 5,645,225 A | 7/1997 | Hasegawa et al. |
| 5,647,536 A | 7/1997 | Yen et al. |
| 5,711,277 A | 1/1998 | Fuseya |
| 5,722,377 A | 3/1998 | Schoenfeld et al. |
| 5,722,600 A | 3/1998 | Horiuchi |
| 5,727,525 A | 3/1998 | Tsuzuki |
| 5,732,679 A | 3/1998 | Takahasi et al. |
| 5,746,189 A | 5/1998 | Kuzuya et al. |
| 5,775,273 A | 7/1998 | Beale |
| 5,775,301 A | 7/1998 | Ganser |
| 5,775,305 A | 7/1998 | Bolger |
| 5,803,028 A | 9/1998 | Rose |
| 5,813,371 A | 9/1998 | Peel |
| 5,819,704 A | 10/1998 | Tarr et al. |
| 5,829,393 A | 11/1998 | Achten et al. |
| 5,878,720 A | 3/1999 | Anderson et al. |
| 6,135,069 A * | 10/2000 | Fenelon et al. ............ 123/46 R |

* cited by examiner

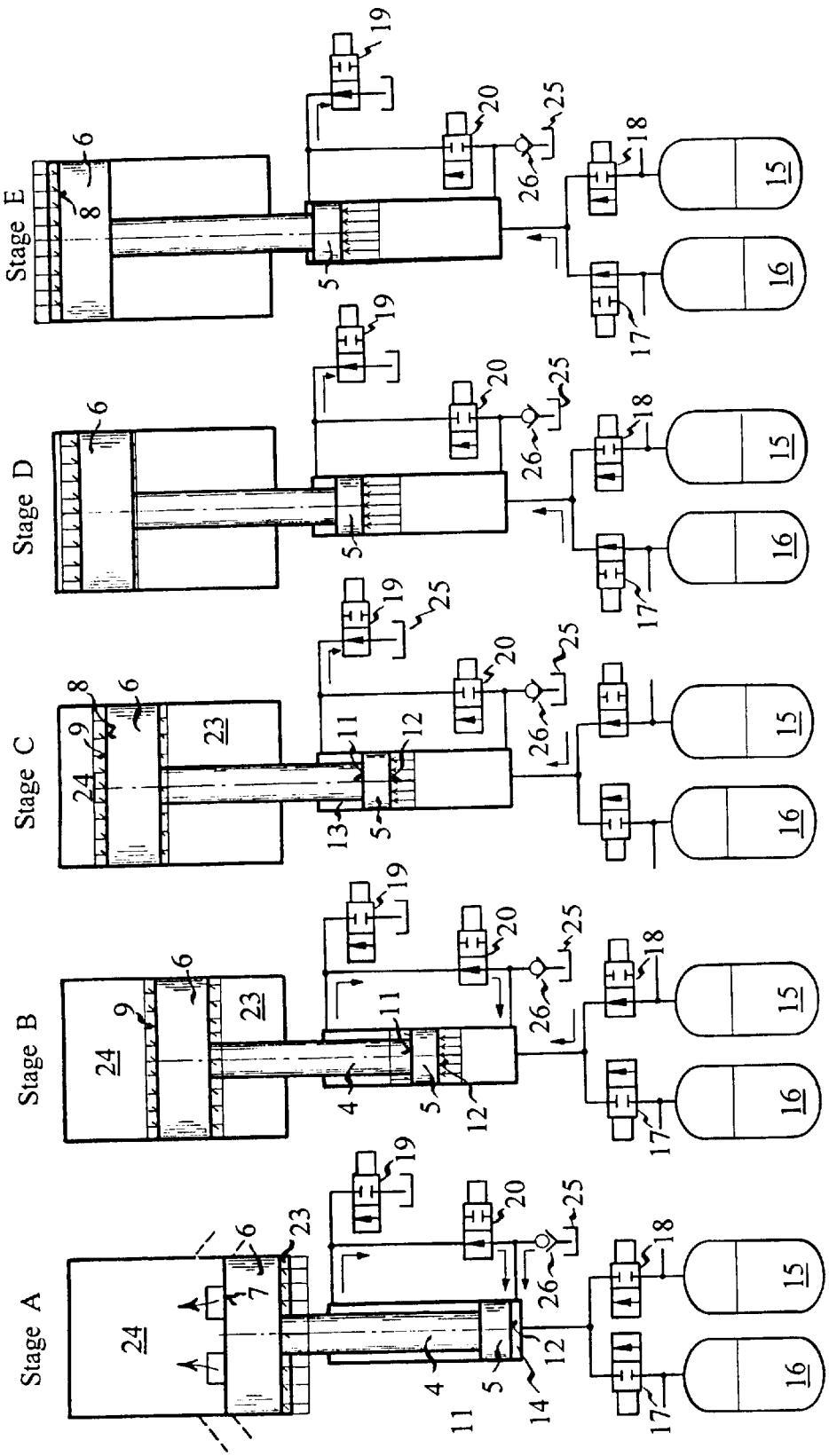

FREE-PISTON INTERNAL COMBUSTION ENGINE

CROSS REFERENCE TO RELATED APPLICATION

This application is a divisional of copending application Ser. No. 09/408,046, filed on Sep. 29, 1999. Now U.S. Pat. No. 6,293,231.

BACKGROUND OF THE INVENTION

1. Technical Field

This invention relates generally to free-piston type internal combustion engines, compressors or pumps, and in particular, to innovations which improve the controllability and efficiency of the free-piston engine or pump and reduce the toxic emissions, the weight and the size of such engines.

2. Background Art

Although advantageous in applications where pressurized fluid is used to transmit the energy, the simple concept of free-piston internal combustion engines or pumps, transferring the chemical energy of a combustible fuel direct into mechanical energy of pressurized hydraulic fluid, is rarely utilized due to the inability to control their operating characteristics, and in particular, the top and bottom end positions of the piston, sufficiently.

Free-piston Control

In one known free-piston engine, disclosed in U.S. Pat. No. 4,791,786, the hydraulic piston control mechanism of the free-piston requires three hydraulic control surfaces in axial direction to control the top-end position and the bottom-end position somewhat sufficiently. The free-piston has a combustion end and a hydraulic end, consisting of a plunger with one outer control surface acting in opposite direction to the combustion forces, and a piston with one larger control surface acting also in the opposite direction and a smaller control surface acting in the same direction as the combustion force. During the compression stroke, pressurized fluid at the outer plunger surface advances the free-piston toward the top-end position while the chamber at the larger piston surface draws fluid in from a reservoir. The smaller piston surface, acting in opposite direction and being smaller than the plunger surface, is permanently pressurized with hydraulic fluid and provides a buffer function at the end of the compression stroke in top-end position by depressurizing the plunger surface. During the expansion stroke, all three control surfaces are exposed to pressurized fluid, advancing the fluid, drawn in during the compression stroke, to the accumulator. The bottom-end position of the free-piston can be obtained by readjusting the position after a stop.

In this prior art free-piston engine, the top-end position is determined by the balance of the buffer force, depending on the fluid pressure in the accumulator, and the dynamic mass forces of the heavy free-piston, depending on its velocity. The bottom-end position is determined by the balance of combustion and dynamic piston mass forces versus hydraulic forces, and depends on the insufficiently controllable, variable velocity of the piston (rpm.) and the fluid pressure in the accumulator. During a cycle interruption, the bottom-end position can be corrected.

The variations in top-end position and bottom-end position are too high to allow for an overall sufficient control of the compression ratio and combustion conditions, reducing the efficiency and increasing the amount of toxic emissions. Furthermore, the requirement for three hydraulic control surfaces increases the cost and size of the free piston engine and reduces the efficiency of the free-piston engine.

In another known free-piston engine, which is disclosed in U.S. Pat. No. 5,556,262, the hydraulic piston control mechanism consists of four control surfaces in axial direction to control the top-end position and the bottom-end position. The free-piston has a hydraulic end, consisting of a compression section, having a larger and a smaller control surface, and a pump section, also having a larger and a smaller control surface in which the larger surfaces are acting in opposite direction to the combustion end of the free-piston assembly.

During the compression stroke, the smaller control surface of the compression section is in communication with the fluid reservoir and the larger control surface is pressurized with fluid from a compression (bouncing) accumulator, advancing the free-piston toward the top-end position, while the pump section of the hydraulic end draws fluid in from the reservoir. During the expansion stroke, the hydraulic section, controlled by non-return valves, advances the fluid to the pressure accumulator, while the pressure conditions in the compression section remain unchanged. The bottom-end position is determined by decreasing combustion forces and increasing hydraulic forces. The hydraulic section has no noticeable influence in the control of the free-piston.

The top-end position is determined by the balance of nearly constant hydraulic forces and mass forces of the free-piston, varying with the velocity of the free-piston, and the compression forces acting in opposite direction. The bottom-end position is controlled by the mass forces of the free-piston in addition to the combustion pressure and the increasing hydraulic forces. Increased accuracy of the bottom-end position is obtained with increasing hydraulic losses to brake the free-piston. The compression ratio, which determines efficiency and combustion conditions as well as the amount of toxic emissions, can only be controlled by changing the pressure in the compression (bouncing) accumulator. However, this results in loss of energy and is very time consuming. Moreover, the need for four control surfaces and the requirement of an additional accumulator increase expense, and require additional space and reduce the efficiency of the free-piston engine.

Charge Mechanism

The utilization of exhaust gas energy increases the efficiency and reduces weight and size by increasing the specific power output, resulting in a smaller engine with less heat and friction losses.

In U.S. Pat. No. 5,261,797, there is disclosed a pressure wave charger (pulse pressure booster) which consists of a compressor, driven by an exhaust turbine or the crankshaft, and a booster, having a spring loaded booster piston, which is reciprocally mounted in a piston bore of a booster housing. The ingress of fresh air from the compressor to one chamber at the first end of the booster piston is controlled by a non-return valve. The egress to the combustion chamber is controlled by a rotary valve. A chamber at the second end of the booster piston, opposite to the first end, is in communication with the sump of the two-stroke combustion engine, controlled by a valve. A second chamber, being in communication with the exhaust port of the combustion engine, can be arranged at the second end of the booster piston, further increasing the pressure of the pressurized air from the compressor in the booster chamber.

Starting in the top-end position after the ignition, the combustion piston advances toward the bottom-end position, compressing the air in the sump while the compressor charges the first booster chamber with fresh, pressurized air. Near the bottom-end position of the combustion piston, the exhaust port and the valve to the sump of the engine open and provide pressure to their respective chambers at the second end of the booster piston in opposition to the compressed air. Pressure, sufficient to overcome the forces of the compressed air and a spring at the opposite side of the booster piston, will advance the piston toward the top-end position and increase the pressure of the compressed fresh air being forced through the intake port into the combustion chamber. Due to the spring force, the booster piston will return in its original position when the ports of the combustion engine are closed during the compression stroke.

The charge apparatus is complex and the overall efficiency low due to friction, leakage and larger amounts of compressed air, not participating on the combustion process.

Fuel Injection Apparatus

Known fuel injection systems provide fuel of increasingly higher pressure levels to a single, centrally or nearly centrally located fuel injector with one or several closely spaced nozzles to provide improved conditions for a more efficient combustion with reduced toxic emissions. The higher injection pressure provides an improved air-fuel mixture for a more efficient and cleaner combustion/lower toxic emissions, but the increased injection pressure consumes part of the gain in efficiency of the combustion process.

It is therefore, an object of the invention to provide a simplified hydraulic control mechanism for the free-piston, an efficient and robust extraction of energy from the exhaust gas and a simplified fuel injection apparatus which allows a more efficient and cleaner combustion.

Another object of the invention is to reduce known technical shortcomings of prior art free-piston engines or pumps, in particular, the limited ability to control the top-end and bottom-end positions of the piston in an inherently simple and efficient manner.

SUMMARY OF THE INVENTION

The present invention provides a novel hydraulic pressure-step force control mechanism for moving a piston or plunger of any apparatus, and for example, for moving the free-piston of an internal combustion engine, a pump, or the like, which hydraulic pressure-step force control mechanism results in a more accurate control of the top and bottom end positions of the piston. In addition, the invention provides a simple exhaust pressure wave charger. Moreover, the invention provides an improved fuel injection apparatus which introduces fuel into the combustion chamber under high pressure conditions and provides a more even distribution over the entire combustion chamber while preventing concentration of jets of atomized fuel within the combustion chamber, resulting in faster, more even combustion characterized by higher efficiency and reduced toxic emissions and soot.

In accordance with the invention there is provided a free-piston internal combustion pump-engine which includes a housing including.a piston bore and at least one free-piston, mounted in the piston bore for reciprocating movement between a bottom-end position and a top end position. The free-piston has a drive end and a combustion end. The drive end of the free-piston cooperates with the piston bore to define a first chamber and a second chamber. The combustion end of the free-piston cooperates with the piston bore to at least partially define a combustion chamber. A control system produces pressure control forces for moving the free-piston between the bottom-end position and the top-end position during a compression stroke, the control system supplying pressurized fluid to the piston bore at the drive end of the free-piston for applying a pressure control force to the drive end of the free-piston to move the free-piston toward the top-end position. The control system varies the supply of pressurized fluid to the piston bore to thereby vary the pressure control force applied to the free-piston at different times during the compression stroke. The free-piston is moved toward the bottom-end position by an expansion pressure within the combustion chamber during an expansion stroke, causing the pressurized fluid to be extracted from the piston bore as the free-piston is moved toward the bottom-end position during the expansion stroke.

In one embodiment of the invention, the combustion end of the free-piston has an outer combustion face and an inner bounce face, and the drive end has two control surfaces, an inner face and an outer face, acting in opposition to the combustion face, to control the top-end and bottom-end positions of the free-piston. At the beginning of the compression stroke, when starting the engine or pump, both hydraulic control surfaces are in fluid communication with a medium pressure accumulator, resulting in a small differential hydraulic piston force. A valve shift depressurizes one of the control surfaces, acting in opposition to the other control surface, increasing the hydraulic piston force in the middle portion of the stroke. In response to a further valve shift, the pressure supply is shifted from the medium pressure accumulator to a high pressure accumulator which results in sufficient force to advance the free-piston into its top-end position. During ignition, the increased pressure in the combustion chamber drives the free-piston toward its bottom-end position. During the expansion stroke, the sequence of valve actuation is reversed and delayed in time to allow for the extraction of the combustion energy. During the expansion stroke, the air in the bounce chamber at the opposite side of the combustion chamber is compressed. The timing of the fast-acting, two-way valves, which control the pressure stages at the hydraulic control piston, and therefore the end positions, is preferably determined by an electronic powertrain controller, considering the operating conditions (e.g., hydraulic and compression pressure, piston velocity, etc.) needed to control the free-piston engine-pump effectively. In accordance with another aspect of the invention, the exhaust pressure wave is transformed into an intake pressure wave, divided by a pressure wave separator, to charge the combustion chamber with pressurized fresh air. This provides higher power density of the engine and improves the scavenging and fuel mixture process. The remaining exhaust energy is extractable at the outlet of the pressure wave charger.

In one embodiment, the pressure wave charger comprises a charge piston having an exhaust end and an air-intake end, reciprocally mounted in a piston bore. The piston bore has an exhaust end chamber in communication with the exhaust port of the combustion engine and the charger exhaust (muffler) port. The charge exhaust port is opened at the end of the charger piston stroke. The piston bore has an intake chamber in communication with an air intake port of the combustion chamber and an air intake (air filter). The exhaust side is pressurized by the exhaust gas pressure wave from the combustion chamber, advancing the charge piston, against the forces of the compressing intake air and a bias structure, toward the bottom-end position of the charger piston, filling the combustion chamber with new compressed air. The bias structure returns the charger piston, with the support of the collapsing exhaust pressure wave, back into the top-end position during the compression stroke of the combustion engine, while the charger piston draws fresh air to the chamber at the air-intake end.

The free-piston engine or pump further includes a novel fuel injection apparatus which provides a finer atomization and a more equal distribution of fuel within the ignition chamber. This results in more uniform air/fuel ratio and combustion, reducing the amount of toxic emissions and soot, and reducing the ignition delay, thereby improving efficiency. In one preferred embodiment, the fuel injection apparatus comprises a novel fuel pump including a fuel injector mechanism and a novel nozzle structure which defines a fuel conduction channel and one or more nozzles. The fuel pump includes a fuel piston mounted in a bore of the fuel pump housing for reciprocating movement within the bore for increasing the pressure of the combustion fuel being injected into the combustion chamber. A second fuel pump can be added to provide uninterrupted fuel supply from the fuel injection pump.

In one preferred embodiment, the nozzle structure includes a fuel injection ring which defines one or more fuel conduction channels, for providing communication between the fuel injector and a plurality of micro-slots which define a plurality of nozzles at the inner, circumferential face of the fuel injection ring which is disposed to encompass the periphery of the ignition chamber. The fuel conduction channels and the micro-slots are preferably configured as depressions, arranged at an axial face of the fuel injection ring, the depressions being covered and sealed by a second section of the injection ring, allowing long and very narrow slots for increased atomization. A comparable function can be obtained by forming a thin shim-like layer on a substrate, incorporating the nozzle arrangement in form of a discontinuities formed in the layer, between the two parts of the fuel injection ring. The circumferential arrangement of slots/ nozzles prevents the concentration of jets of atomized fuel and provides a more even distribution over the whole ignition chamber. The assembly of more than one multi channel/micro-slot arrangement allows for differently timed injection or different combustion ingredients.

BRIEF DESCRIPTION OF THE DRAWINGS.

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIGS. 2A–2I are simplified representations of the hydraulic piston control mechanism, showing the operation states of the cycle-valves, over a complete work cycle of a single piston, two-stroke engine.

DETAILED DESCRIPTION OF THE PREFERRED EMBODIMENTS

Figure 1:
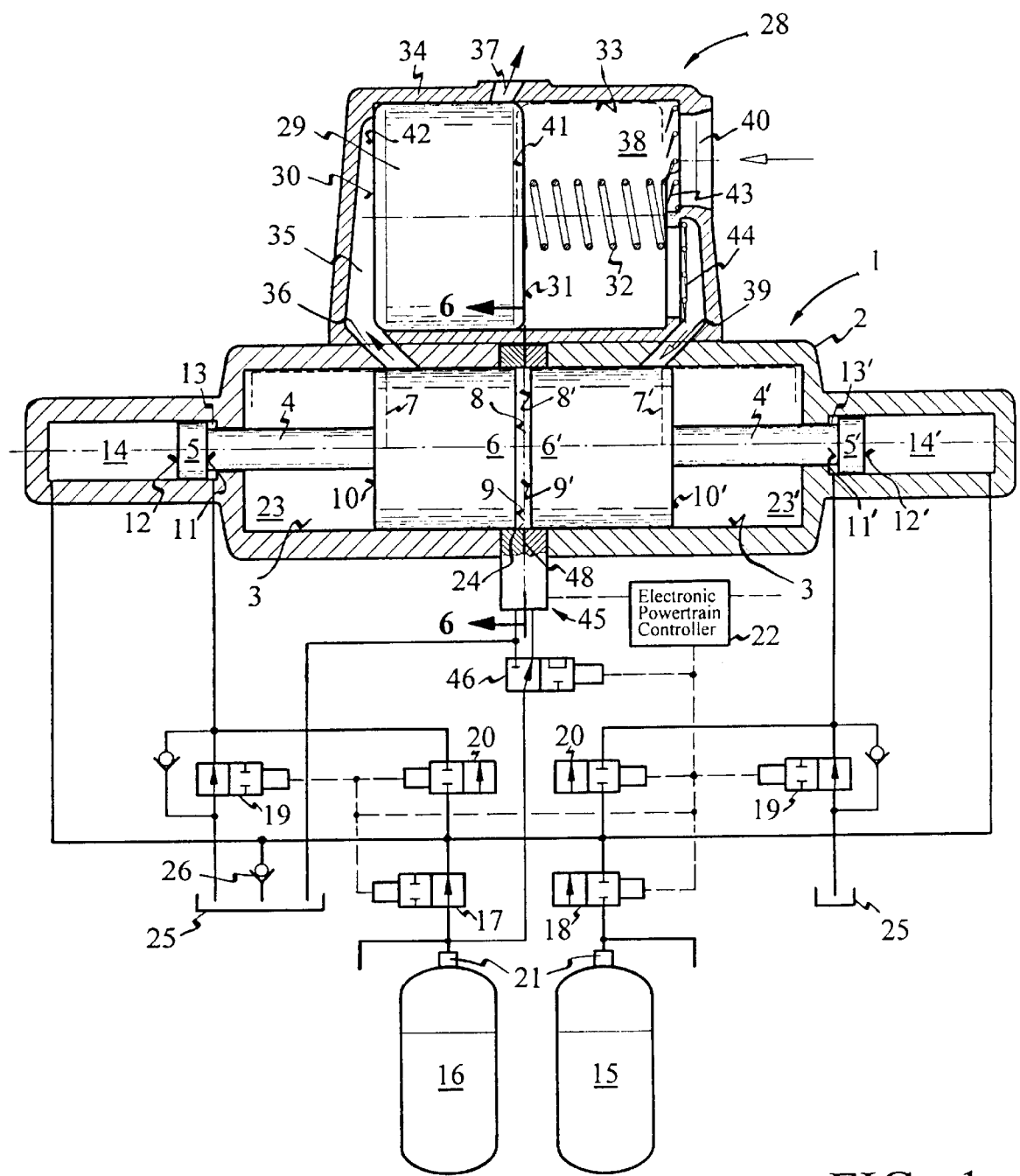
FIG. 1 is a simplified representation of a free-piston engine and hydraulic control system in accordance with the invention.

Referring to the drawings, and in particular to FIG. 1, the novel hydraulic pressure-stepwise force control mechanism is described with reference to an application in a free-piston internal combustion engine, shown in FIG. 1, for moving the free-piston of the engine. In one preferred embodiment, the internal combustion engine 1 is a two-stroke compression or spark ignition engine including a single cylinder 3 with two opposed pistons 4 and 4', and which is pressure wave charged. However, the piston force control mechanism can also be applied to four-stroke compression or spark ignition engines. The free-piston engine includes a novel fuel injection apparatus. Although the invention is described with reference to an internal combustion engine, the invention has other applications including pumps, compressors and the like. Moreover, the stepwise force control of the piston or plunger is also advantageous for applications of a piston or plunger for force and/or speed control, and in particular, in those types of applications that are commonly referred to as constant pressure or load sensing applications.

The free-piston pump-engine 1 includes an engine housing 2 with a piston bore 3 and a pair of free-pistons 4 and 4', slidably mounted therein. As will be shown, the free-pistons transfer the combustion pressure directly into hydraulic pressure, thus reducing the number of parts within an engine, the friction losses, size and cost of the internal combustion engine. In one embodiment, multiple, controller actuated, hydraulic two-way valves provide pressurized hydraulic fluid to the differential piston ends of the free-pistons, during each operating cycle, thus providing step-wise increasing and decreasing piston forces which provide accurate control of the top-end and the bottom-end positions of the pistons. This results in improved control of the combustion process, reducing fuel consumption and toxic emissions. A pressure wave charger 28, which is attached to the engine, separating the exhaust pressure chamber from the intake pressure chamber, transforms the exhaust pressure wave directly into an intake pressure wave, thus simplifying the charge mechanism of the engine and providing a larger portion of the thermal exhaust energy for an additional mechanism (exhaust turbine) to extract energy for increased efficiency. A fuel injection apparatus 45 transfers hydraulic pressure directly into pressurized fuel. An injector valve of the fuel injection apparatus 45 supplies the fuel from a fuel accumulator/common rail to relatively narrow injector nozzles in communication with the ignition chamber to improve fuel atomization, air-fueling mixing and distribution, thereby reducing toxic emissions, soot and fuel consumption.

Free-piston Control.

More specifically, with continued reference to FIG. 1, the pistons 4 and 4' reciprocate within the piston bore 3 in opposing directions between their bottom-end positions 7 and 7' (represented by the dashed lines), i.e., the intake/exhaust end, and their top-end positions 8 and 8', i.e., the combustion end. During the compression stroke, the pistons 4 and 4' are moved toward one another. During the expansion stroke, the pistons 4 and 4' are moved away from one another. The space between the pistons 4 and 4' defines a combustion chamber 24 for the engine 1. The pistons 4 and 4' are substantially identical and so only piston 4 will be described, the same reference numerals with the addition of a prime notation being used to designate like parts of the piston 4'.

Piston 4 has a small hydraulic end 5 and large combustion end 6. The double acting combustion end 6 has a large outer combustion face 9 and a smaller, inner bounce face 10, acting in opposite direction. The double acting hydraulic end 5 has a smaller inner face 11, facing in the direction of the combustion end 6 of the free-piston, and a larger, outer face 12 facing in opposite direction. The chamber 13 at face 11 and the chamber 14 at face 12 are in fluid communication with hydraulic fluid accumulators, including a medium pressure hydraulic fluid accumulator 15 and a high pressure hydraulic fluid accumulator 16. The flow of fluid between the accumulators 15 and 16 and the engine 1 is controlled by a hydraulic valve system, including a plurality of cycle two-way valves 17–20, 19' and 20' which are operated by the electronic powertrain controller 22 and one-way valve 26. The electronic powertrain controller 22 also provides monitoring and control functions in the manner known in the art. Further valves, including valves 27 and 46 (FIGS. 5 and 6), provide other functions, such as start, positioning and safety functions. The cycle valves 17–20 can provide pressurized hydraulic fluid to both faces 11 and 12, or only to face 12 at the hydraulic end 5, resulting in three (or four) different values of piston force, for advancing the free-piston 4 to the top-end position. Similarly, the cycle valves 17–18, 19' and 20' can provide pressurized hydraulic fluid to both faces 11' and 12', or only to face 12' at the hydraulic end 5', of free-piston 4', resulting in three (or four) different values of piston force, for advancing the free-piston 4' to the top-end position. The valves 17–20, 19' and 20' are fast operating valves. It is pointed out that the function of valves 19 and 19' can be provided by a single two-way valve (not shown). Also, the function of valves 20 and 20' can be provided by a single two-way valve (not shown). However, the use of separate valves 19, 19' and 20, 20' is preferred because this allows independent control of the application of pressurized fluid to the two free-pistons 4 and 4'.

In one preferred embodiment, the free-pistons 4 and 4' are moved from their bottom-end position to their top-end position by the control of the supply of hydraulic fluid to the hydraulic ends 5 and 5' of the free-pistons 4 and 4'. However, the energy for the hydraulic ends 5 and 5' can come from any type of pressurized medium, such as pressurized air, water, hydraulic fluid, etc.

The sequencing of the valves 17–20, 19' and 20' is controlled by the electronic powertrain controller 22. The electronic powertrain controller 22 monitors or senses the axial positions of the free-pistons 4 and 4' within the piston bore 3 and the velocity of the free-pistons 4 and 4' as the free-pistons are moved during the compression and expansion strokes, providing position and velocity information. The electronic powertrain controller 22 also monitors or senses temperatures within the free-piston engine, the pressure in the combustion chamber 24, the pressures in the chambers 13, 14 and 13', 14', and exhaust gas conditions during the operating cycle, for providing temperature, pressure and exhaust gas condition information. The electronic powertrain controller 22 uses the position, velocity, temperature, pressure and exhaust gas information to determine when the valves 17–20, 19' and 20' are to be operated during the compression and expansion strokes.

An illustration of the pressure-step force control operation of the engine 1, in accordance with the invention, is now made with reference to the simplified representation of a free-piston engine which includes only one free-piston 4 slidably movable within the bore 3. A complete cycle of the engine controlled by the hydraulic pressure-step force control arrangement in accordance with one embodiment of the invention includes nine stages. The nine stages of a complete cycle of the engine are illustrated in FIGS. 2A–2I. Only cycle valves are shown in FIGS. 2A–2I in conjunction with a simplified representation of one of the free-pistons 4. The stages of the compression stroke are illustrated in FIGS. 2A–2E and the stages of the expansion stroke, including injection and combustion, are illustrated in FIGS. 2F–2I.

At the beginning of the compression stroke, the force of the compressed air in bounce chamber 23, acting in opposite direction to the air in combustion chamber 24, advances the free-piston toward top-end position, drawing hydraulic fluid from reservoir 25 through non-return valve 26 into chamber 14 at the hydraulic end 5.

Briefly, at the beginning of the compression stroke, or shortly thereafter, when starting the engine, both hydraulic control surfaces 11 and 12 are in communication with the medium pressure accumulator 15, resulting in a small differential hydraulic piston force. By way of example, the pressure of the hydraulic fluid in the medium pressure accumulator 15 can be 6000 pounds per square inch (psi). A valve shift depressurizes the smaller control surface 11, acting in opposite direction to the larger control surface 12, increases the hydraulic piston force in the middle section of the stroke. A further valve shift in pressure supply, from the medium pressure accumulator 15 to the high pressure accumulator 16, provides sufficient force to advance the free-piston into top-end position. By way of example, the pressure of the hydraulic fluid in the high pressure accumulator can be 8000 psi. However, the pressure of the hydraulic fluid supplied by the medium pressure accumulator and that supplied by the high pressure accumulator will vary somewhat during the operation of the free-piston engine as is known. The electronic powertrain controller 22 monitors the pressure within the medium pressure accumulator 15 and the pressure within the high pressure accumulator 16 by way of suitable sensors 21. The electronic powertrain controller 22 can adjust the amount of fuel supplied to the ignition chamber 24 by the fuel injector apparatus 45 and can control the operation of the hydraulic valves 17–20, 19' and 20' to adjust the pressure step-force control as a function of the pressure within the medium pressure accumulator 15 and the high pressure accumulator 16 to make combustion fuel usage as economical and clean as possible.

Figure 5:
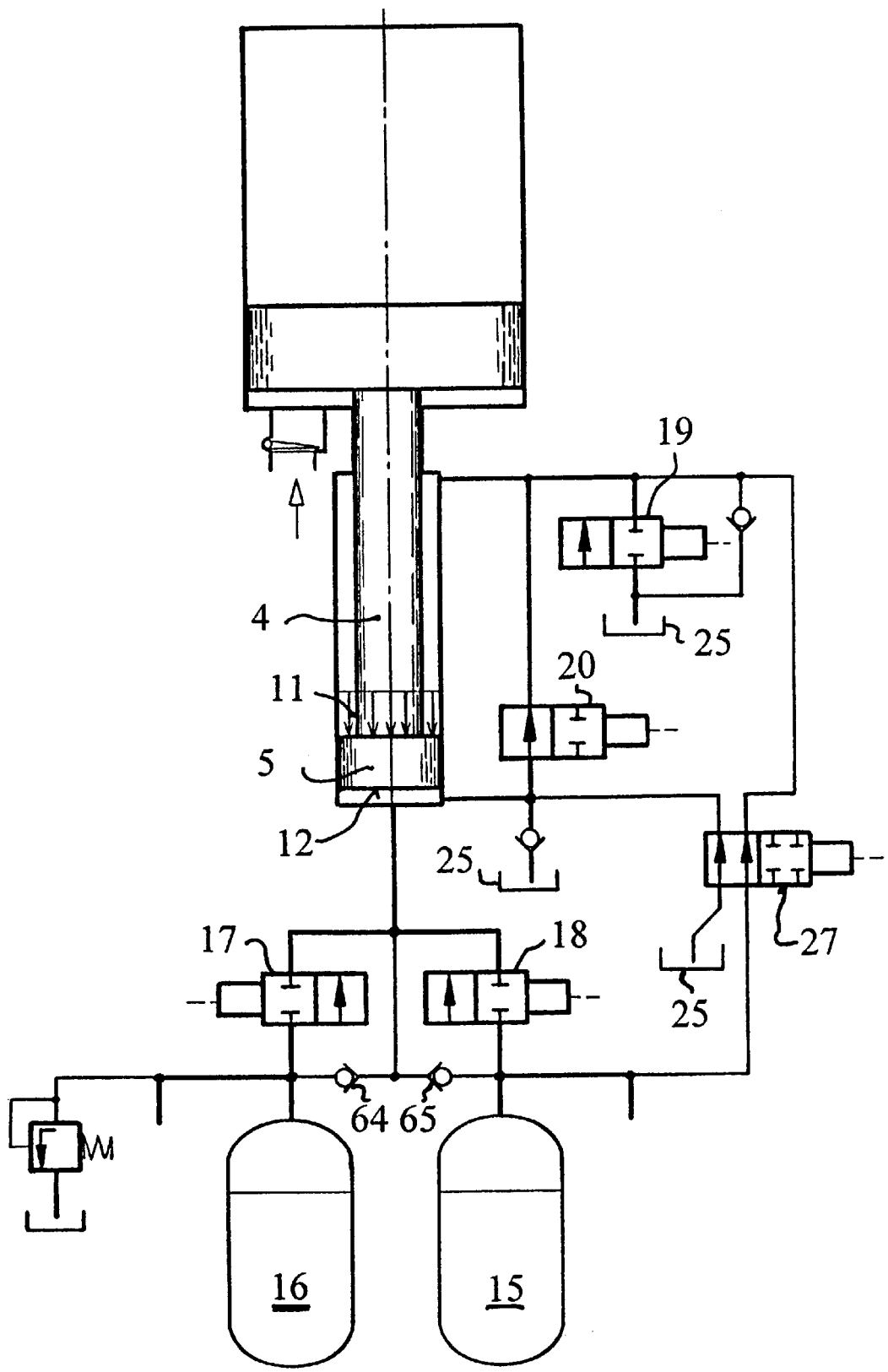
FIG. 5 shows a static engine start arrangement, including a hydraulic starter valve, for the free-piston engine shown in FIGS. 2A–2I.

More specifically, referring initially to FIGS. 2A and 5, when starting the engine, the free-piston 4 is located in an undefined position between the top-end and the bottom-end positions. A static start position, in which the free-piston 4 is located at the bottom-end position, can be obtained by pressurizing only the small face 11 of hydraulic end 5. In one embodiment, a valve 27 (FIG. 5) is operated, depressurizing control surface 12 and pressurizing control surface 11, which causes the free-piston 4 to be moved into the bottom-end position so that there is only little pressurized air in the sump chamber underneath the free-piston 4. However, air will be sucked into the sump chamber through a non-return valve at the end of the compression stroke.

For the initial suction stage A of the compression stroke of an already running engine, i.e., a non-static start, the air pressure in the bouncing chamber moves the free-piston 4 towards the top-end position and draws hydraulic fluid into chamber 14 at control face 12, illustrated in FIG. 2A. The valves 17 and 18 are initially closed so that pressurized fluid is not being supplied from either accumulator 15 and 16 to the engine. Also, valve 19 is closed and valve 20 is open, so that the reservoir 25 is communicated through one-way valve 26 with both ends of the hydraulic piston. At the combustion end 6 of the free-piston 4, air pressure increases in the combustion chamber 24 and decreases in the sump chamber 23 as the free-piston 4 is advanced further toward the top end position.

Referring now to FIG. 2B, which illustrates the second stage B of the combustion stroke, control valve 18 is opened to supply medium pressure fluid from accumulator 15 to the hydraulic end of the free-piston 4. Valve 20 remains open. In an intermediate piston position, the increasing compression forces in the combustion chamber 24, and the decreasing, opposing bounce forces in chamber 23 and inertia forces of the free-piston 4 are balanced. Accordingly, pressurized hydraulic fluid is supplied to the hydraulic end 5 to advance the free-piston further toward the top-end position 8 (FIG. 1). During this phase, as illustrated in FIG. 2B, control valves 18 and 20 are open, providing a fluid connection between the medium pressure accumulator 15 and the piston faces 11 and 12 at the hydraulic end 5 of the free-piston 4, resulting in a differential force on the free-piston 4 which advances the free-piston 4 further toward top-end position 8.

That is, the force on the bottom surface 12 of the hydraulic end 5 of the free-piston 4 is greater than the force on the other surface 11 of hydraulic end 5 of the free-piston 4 so that there is a net or differential force on the hydraulic end 5 of the free-piston 4 that moves the free-piston 4 toward the top-end position.

At the hydraulic end 5 of the free-piston 4, the small differential force of medium pressure has advanced the free-piston 4 into an intermediate position. It is pointed out that preferably stage B is activated earlier to compensate for the reduced air pressure underneath the free-piston 4 when the engine is being started. At the combustion end 6 of the free-piston 4, air pressure increases in the combustion chamber 24 and decreases in the sump chamber 23, or more air is sucked in during the starting stroke.

Referring now to FIG. 2C, the increasing compression forces at the outer face 9 at combustion end 6 are overcompensated by higher hydraulic forces at hydraulic end 5 which are obtained by closing the valve 20 and opening the valve 19 to discharge the pressurized hydraulic fluid from chamber 13 at face 11 of the free-piston 4 into the reservoir 25 so that now a single hydraulic force is being applied only to surface 12 of the free-piston 4 during stage C (FIG. 2C). At the hydraulic end 5 of the free-piston 4, the single hydraulic force being applied to surface 12 of medium pressure advances the free-piston 4 toward the top-end position. At the combustion end 6, air pressure further increases in the combustion chamber 24 and decreases in the sump chamber 23, as more air is sucked in during the starting stroke.

In stage D, valve 18 is closed and then valve 17 is opened. This changes the source of hydraulic fluid being supplied to surface 12 from the medium pressure accumulator 15 to the high pressure accumulator 16, resulting in higher forces for advancing the free-piston to its final top-end (or ignition) position 8 (FIGS. 2D–2E). The sequencing of the operation of valves 18 and 17 preferably is controlled so that both valves are not open at the same time. The hydraulic control system can include suitable pressure relief valves connected to the hydraulic lines between the valves 17 and 18 and the free-pistons 4 and 4' to limit pressure. At the combustion end 6 of the free-piston 4, air pressure in the combustion chamber 24 increases further. At this point, the pressure in the sump chamber 23 continues to decrease.

Referring to FIG. 2E, during stage E, at the hydraulic end 5 of the free-piston 4, the single outer force of high pressure provided by the fluid at high pressure from accumulator 16 advances the free-piston 4 into the top-end position. It is pointed out that an earlier start of the application of the high pressure fluid, or applying the high pressure fluid for a longer duration, both in combination with the inertial forces of the free-piston 4 will vary the outer force which determines the top-end/ignition position. The bottom-end positioning can be controlled in a similar manner. The control of the top end and the bottom end positions affects the compression ratio. Thus, the compression ratio can be varied by the electronic powertrain controller 22 (FIG. 1) from stroke to stroke, adapting to the power or pressure needs of the user of energy. Furthermore, the free-piston 4 can be held in the top-end position to influence the combustion conditions. Moreover, a further hydraulic force of intermediate size can be obtained at the hydraulic end by communicating faces 11 and 12 with the high pressure accumulator 16, prior to applying the single outer force of high pressure. This intermediate hydraulic force can be produced by operating valves 17 and 20 to an open condition with valves 18 and 19 closed. At the combustion end 6 of the free-piston 4, during the fifth stage E of the compression cycle, air pressure in the combustion chamber 24 continues to increase and the pressure in the sump chamber 23 is nearly depleted.

Then, fuel is injected into the combustion or ignition chamber 24 and ignited. The injection of fuel, and the following combustion, increase the pressure in the combustion chamber 24, advancing the free-piston 4 to bottom-end position 7 (FIGS. 2F–I). The combustion energy, in form of higher pressure at the outer face 9 at the combustion end 6 of the free-piston 4 during the expansion stroke, is extracted by generally the same sequence but delayed actuation of the hydraulic control valves 17 to 20.

During ignition, the increased pressure in the combustion chamber 24 pushes the free-piston 4 toward the bottom-end position. The sequence of valve actuation is reversed during the expansion stroke, and delayed in time to allow for the extraction of the combustion energy. That is, the states of valves 17–20 (19', 20') for stages G, H and I correspond to those for stages D, C and B, respectively. During the expansion stroke, the air in the bounce chamber, at the opposite side of the combustion chamber, is compressed for advancing the free-piston during the next combustion stroke, toward the top-end position, while drawing fluid into the large chamber at the hydraulic end. Hydraulic pressure from the accumulator is applied to the hydraulic end when the compression and bounce forces at the combustion end are in or nearly in balance to advance the free-piston to its top-end position.

Figures 2F, 2G, 2H, 2I:
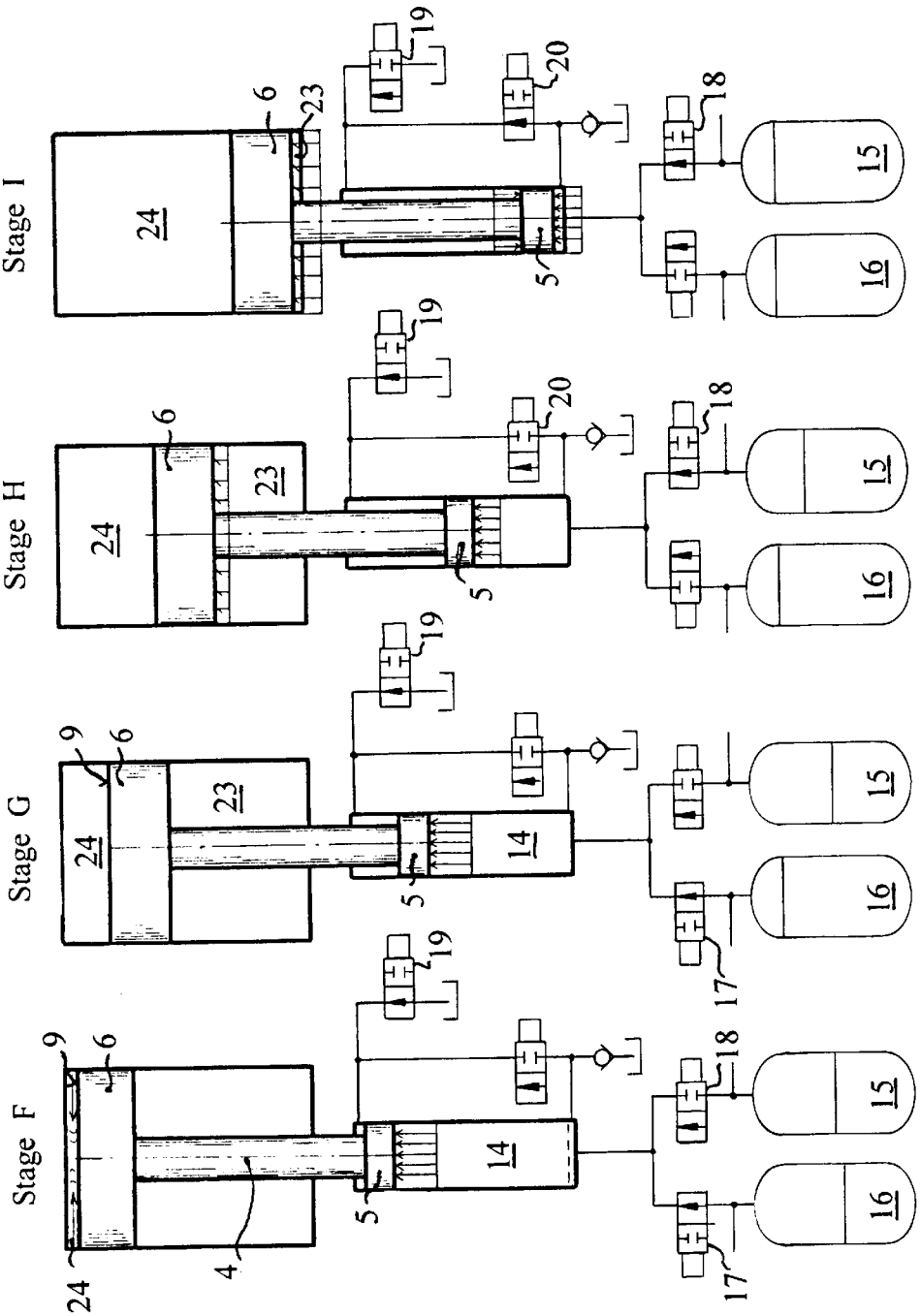

More specifically, referring to FIG. 2F, during stage F of the expansion stroke, the pressure in the combustion chamber 24 increases instantaneously and advances the free-piston 4 toward the bottom-end position. Hydraulic fluid of high pressure at the outer chamber 14 of hydraulic end 5 is pumped through valve 17 into the high pressure accumulator 16.

Referring now to FIG. 2G, which illustrates stage G, the decreasing pressure in the combustion chamber 24 has advanced the free-piston 4 into an intermediate position. The air pressure in the sump 23 increases. Hydraulic fluid of high pressure at the outer chamber 14 of the hydraulic end 5 is still being pumped into the high pressure accumulator 16.

Referring to FIG. 2H, the decreasing pressure in the combustion chamber 24 has advanced the free-piston 4 into an intermediate position. The air pressure in the sump 23 further increases. Hydraulic fluid of medium pressure at the outer chamber 14 of the hydraulic end is pumped into the medium pressure accumulator 15 through a shift of a two-way valves 17 and 18.

In the final stage I, shown in FIG. 2I, the decreasing pressure in the combustion chamber 24 has advanced the free-piston 4 into the bottom end position. The air pressure in the sump 23 has reached a maximum.

Hydraulic fluid of medium pressure and small displacement of the differential piston is pumped into the medium pressure accumulator 15. The timing of the operation of the two-way valve 20, activating the function "differential piston," determines the bottom-end position. Furthermore, the free-piston 4 can be held briefly in bottom-end position 7 to influence the scavenging conditions.

The foregoing description of the operation of the free-piston control makes reference only to free-piston 4. However, both of the free-pistons 4 and 4' are being driven between their top and bottom end positions during each cycle of operation, and valves 19' and 20' are being operated along with valves 19 and 20, respectively. Moreover, although the step pressure force control function in accordance with the invention is described with reference to a free-piston engine having a pair of free-pistons 4 and 4', the step pressure force control function can be used in applications which include only a single free-piston.

Figure 1A:
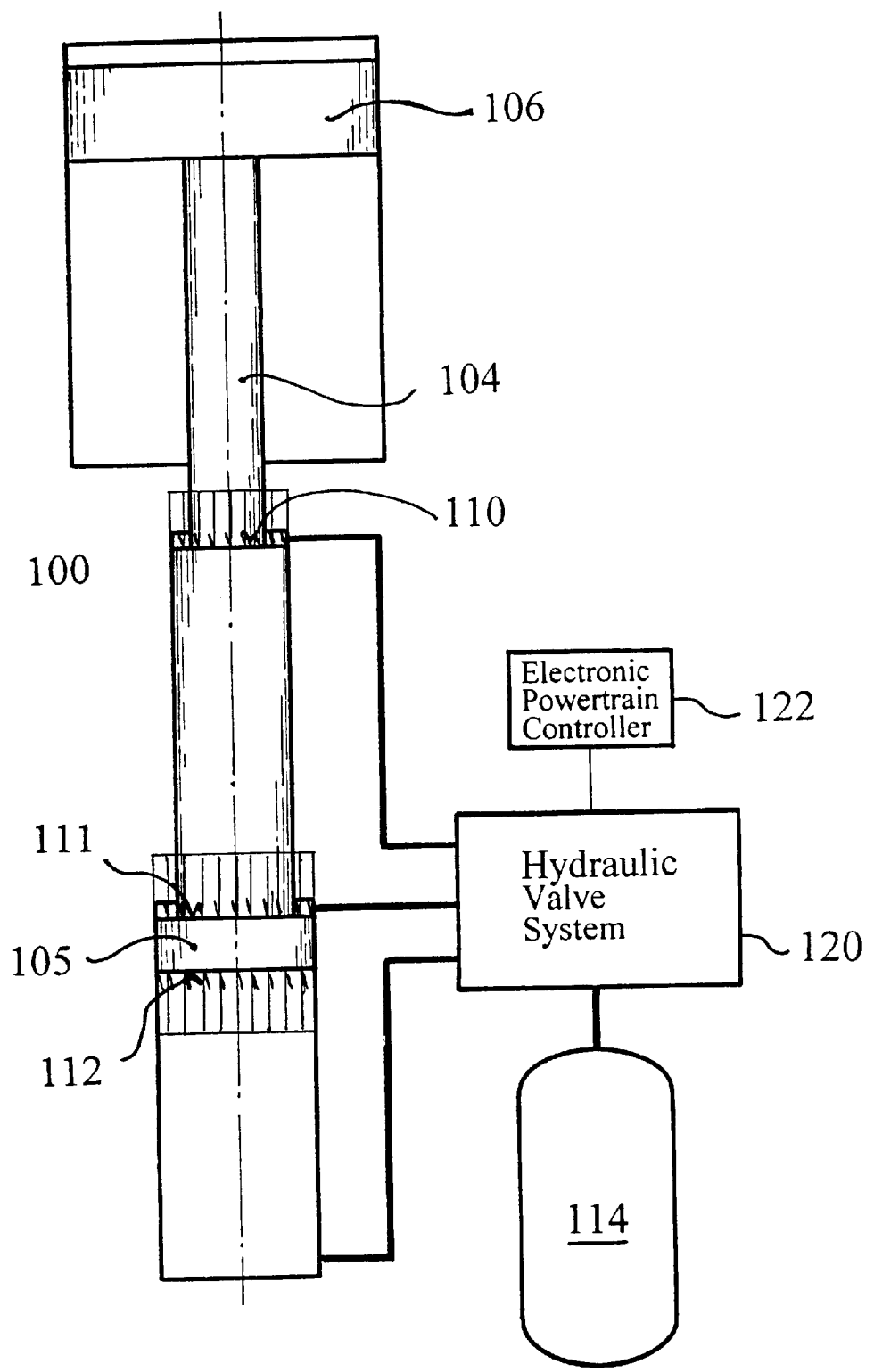
FIG. 1A is a simplified representation of a further embodiment of a free-piston engine in accordance with the invention.

In addition, the engine can be operated with only one accumulator or pressure level, reducing the hydraulic piston forces from three to two. In one such embodiment, the high pressure source 16 and valve 17 (or pressure source 15 and valve 18) are not included in the hydraulic control system. Also, the powertrain can be operated with more than two accumulators or pressure levels. When more than two accumulators or pressure levels are used, the piston forces can be broken down into smaller increments. In yet another arrangement illustrated in FIG. 1A, a free-piston internal combustion engine 100 includes a free piston 104 having a hydraulic end 105 that includes a third pressurized surface 110 in addition to pressurized surfaces 111 and 112. In this embodiment, four hydraulic forces are produced using a single accumulator 114, a hydraulic valve system 120, controlled by a powertrain controller 122, and the three piston surfaces 110–112. The lowest force net is produced when all surfaces 110, 111 (acting in the direction of the combustion force) and 112 (acting in the opposite direction) are pressurized. An intermediate net force is produced when the smaller of the surfaces 110 and 111 is not pressurized. The highest force is produced when neither surface 110 nor 111 is pressurized.

Figure 3:
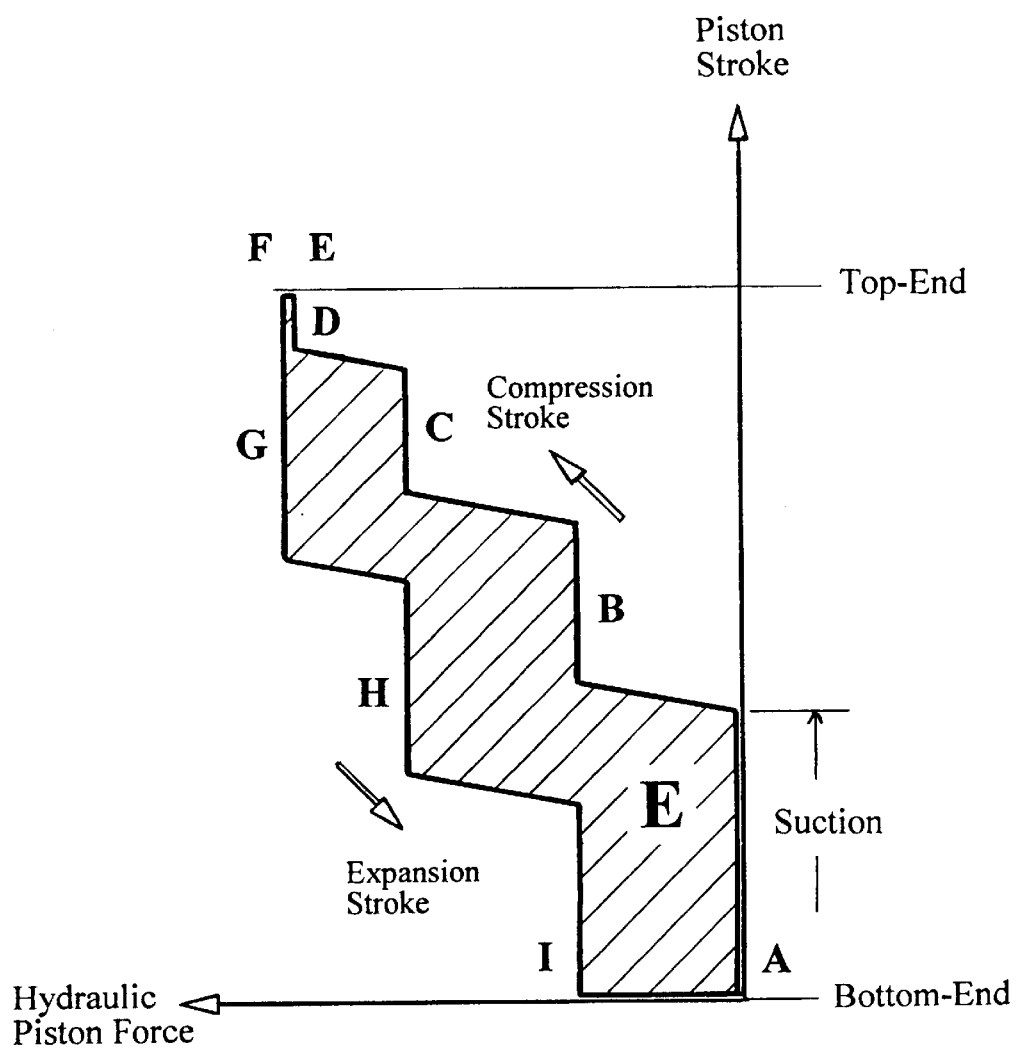
FIG. 3 is a piston force diagram, indicating hydraulic piston force as a function of stroke during one complete cycle of the piston control mechanism as shown in FIGS. 2A–2I.

FIG. 3 shows the conceptual hydraulic piston force diagram, indicating the energy/work E extracted during the nine stages of the cycle which are indicated in FIG. 3 by the corresponding letters A–I. In FIG. 3, the energy E being extracted is represented by the hatched area. It is pointed out that the force characteristic, shown in FIG. 3, illustrates the pressure-step force function provided by one preferred embodiment and that other force characteristics can be obtained by using different valve arrangements, different valve sequencing and alternative sources of pressurized hydraulic fluid. For example, by communicating the high-pressure accumulator 16 with both faces 11 and 12 by opening both valves 17 and 20, and closing valves 18 and 19, a fourth hydraulic force (differential force) of intermediate size (not illustrated) can be provided at the hydraulic end 5. Also, one or more than two sources of pressurized fluid can be used, such as a low, medium, and high pressure source for a more thorough adaptation of force needs.

Figure 4:
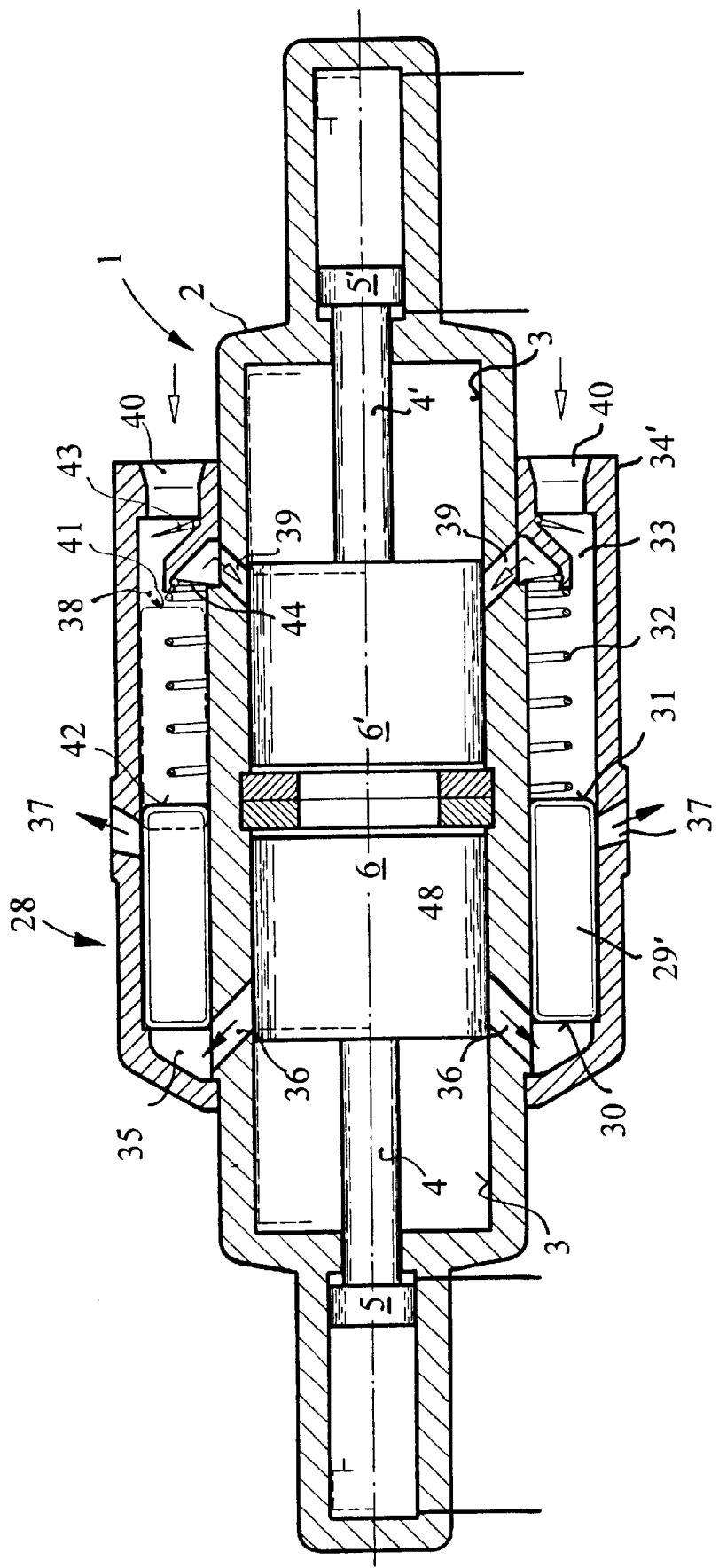
FIG. 4 is a cross section view of one embodiment of a free-piston engine of the system shown in FIG. 1.

FIG. 4 is a cross section view of one embodiment of a free-piston engine of the system shown in FIG. 1. The fuel injection apparatus 45 (FIG. 1), which supplies combustion fuel to the fuel injection structure 46, is not shown in FIG. 4. In the embodiment of the free-piston engine shown in FIG. 4, the charger housing 34' extends around the engine housing 2, defining an annular piston bore 33', and the charger piston 29' is a generally annular member. The spring 32 encircles the engine housing 2. The exhaust inlet port 36, the exhaust port 37, the intake port 39 and the air intake 40 are defined by annular openings.

Referring to FIG. 5, a static engine start position (bottom-end 7), in which the free-piston 4 is located at the bottom-end position, can be obtained by switching valve 27 to its open position, providing pressurized fluid from the accumulator 15 to control face 11 and depressurization of control face 12 at the hydraulic end 5, while all of the cycle valves 17, 18, 19, and 20 are in closed positions.

Pressure Wave Charger

Referring again to FIG. 4, the pressure wave separator apparatus 28, includes a generally annular charger piston 29' slidably mounted in a piston bore 33' of a charger housing 34' for movement between bottom and top end positions. The charger piston 29' is shown in the top end position 42, the bottom end position 41 of the charger piston being shown in phantom in FIG. 4. The charger piston 29' includes an exhaust end 30 and air intake end 31. A bias mechanism, such as a spring 32 or other suitable bias device, biases the charger piston 29' towards the top end position. A chamber 35 at the side of the exhaust end 30 is in fluid communication with the exhaust port 36 of piston bore 3 and with the charger exhaust 37 (muffler) when the charger piston 29' is in the bottom-end position 41. An intake chamber 38 at the intake end 31 of charger piston 29' is in fluid communication with an intake port 39 of piston bore 3 and the air intake 40 (air filter). The pressure wave separator preferably is used with one cylinder engines.

Initially, the charger piston 29' has been moved to the bottom end position 41 by the exhaust forces due to an exhaust gas pressure wave introduced into the chamber 30 through the exhaust inlet port 36. The spring 32, acting at the air intake end 31 of the charger piston 29', moves the charger piston 29' in a direction opposite to that of the exhaust forces acting at the face 30 of the exhaust end. This advances the charger piston 29' into the top-end position 42, drawing fresh air through a non-return valve 43 into the intake chamber 38. The next exhaust gas pressure wave, which is introduced through the open exhaust port 36 to the face of the exhaust end 30, advances the charger piston 29' toward the bottom-end position 41, pumping fresh air from the intake chamber 38 through a non-return valve 44 and intake port 39 into the combustion chamber 24 of piston bore 3. The exhaust end 30 of charger piston 29' opens the fluid connection to exhaust 37 before it reaches bottom end position 41, discharging the exhaust gas to complete the engine cycle.

Fuel Injection Apparatus

Figure 6:
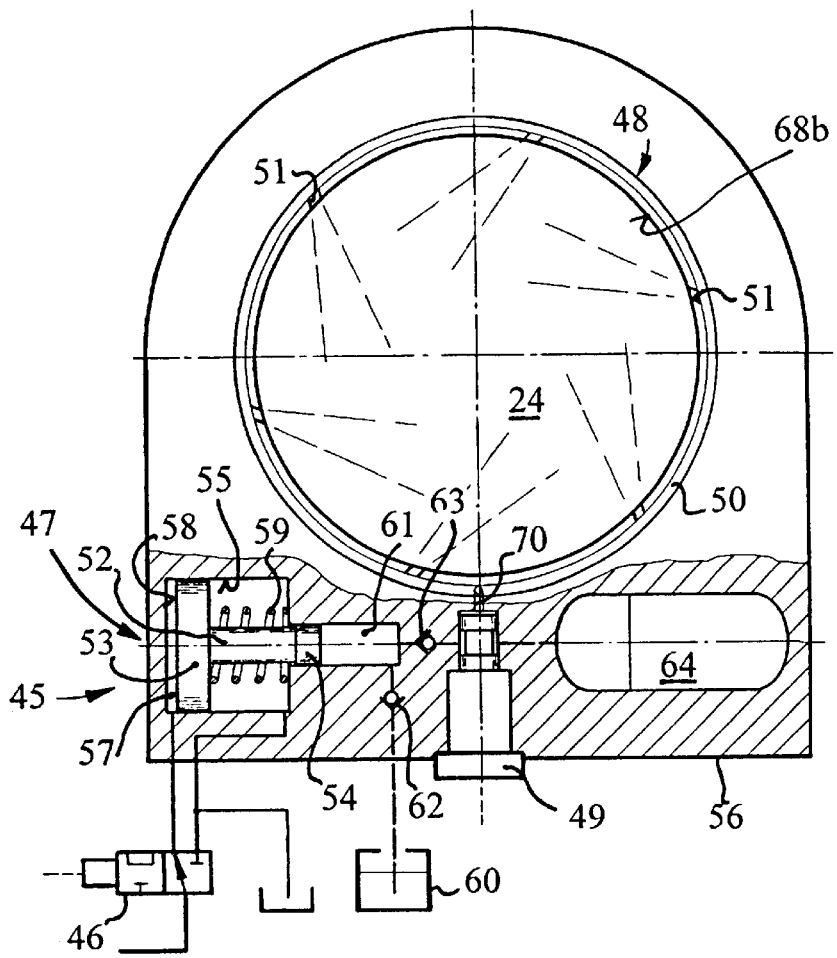
FIG. 6 is a cross section view of the fuel injection apparatus taken along the line 6—6 of FIG. 1.

Referring now to FIGS. 1 and 6, in one preferred embodiment, the fuel injection apparatus 45 includes a fuel injection pump 47 (FIG. 6), having an associated hydraulic fluid pump valve 46, a fuel injector valve 49 and a fuel injection nozzle structure 48, which in one preferred embodiment comprises an injection ring which defines a fuel conduction channel 50 and one or more nozzles 51 which are in fluid communication with the fuel conduction channel. The fuel injection nozzle structure 48 encompasses the combustion or ignition chamber 24, bordering the faces 9 and 9' (FIG. 1) of the combustion ends 6 and 6' of the free-pistons 4 and 4'.

Referring to FIG. 6, which is a cross section of the fuel injection apparatus taken along line 6—6 of FIG. 1, in one preferred embodiment, the fuel pump 47 is operated hydraulically. However, the energy for the hydraulic end can come from any type of pressurized medium, such as pressurized air, water, hydraulic fluid, etc. The hydraulic fuel pump 47 is disposed in fluid communication with a fuel accumulator/common rail 64, the fuel injector valve 49, and the fuel conduction channel 50 of the nozzle structure 48. The fuel injector pump 47 includes a fuel pump piston 52. The fuel pump piston 52 is mounted in a bore 55 of the fuel pump housing 56 for reciprocating movement within the bore 55 between a top-end position, illustrated in FIG. 6, and a bottom-end position. The fuel pump piston is reciprocated within the bore 55 for increasing the pressure of the combustion fuel being injected into the combustion chamber 24 through the nozzles 51. The fuel pump piston 52 is generally cylindrical in shape and has a large hydraulic end 53 and small fuel end 54. The charge and discharge of the chamber 57 at the outer face 58 of the fuel pump piston 52 with pressurized hydraulic fluid from accumulator 16 (FIG. 1), together with the bias force provided by a bias device, such as a spring 59, (acting in opposite direction to the hydraulic forces at the outer face 58), provides a reciprocal pumping movement of fuel pump piston 52. The ingress of combustion fuel from a fuel reservoir 60 to the small chamber 61 at the fuel end 54 and the egress of fuel to the fuel accumulator/common rail 64 are obtained by non-return valves 62 and 63. The hydraulic fluid pump valve 46 and the fuel injection valve 49 are preferably operated under the control of the electronic powertrain controller 22 (FIG. 1).

It is assumed initially that the fuel pump piston 52 is in the top-end position and that the chamber 57 at the hydraulic end 53 of the fuel pump piston 52 contains hydraulic fluid. The combustion fuel has been drawn into chamber 61 from the reservoir 60 through the one-way valve 62 as the piston 52 was returned to the top-end position in the last cycle. The hydraulic fluid pump valve 46 is operated so that pressurized hydraulic fluid from the hydraulic accumulator 16 is supplied to the chamber 57 at the hydraulic end 53 of the fuel pump piston 52. The hydraulic fluid advances the fuel pump piston 52 toward the bottom end position (to the right in FIG. 6), compressing the spring 59 and pumping the highly pressurized fuel through the one way valve 63 into the fuel accumulator/common rail 64, against the fluid pressure of the fuel accumulator/common rail 64. When the chamber 57 has been depressurized, the spring 59 returns the fuel pump piston 52 back into top end position (to the left in FIG. 6), drawing fuel from the reservoir 60 through non-return valve 63 into the chamber 61 at the fuel end 54 of the fuel pump piston 52 for the next cycle.

When injection valve 49 is opened under the control of the electronic powertrain controller 22, the pressurized fuel in the accumulator/common rail 64 is forced into the channel 50 and through the nozzles 51 and directed into the combustion chamber 24.

Figure 7:
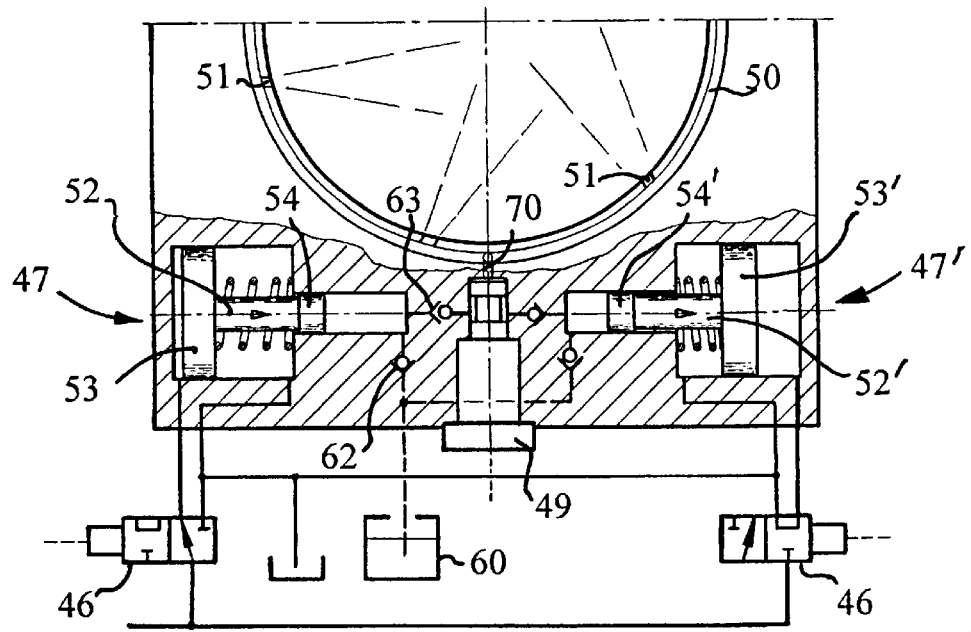
FIG. 7 is a cross section view, similar to that of FIG. 6, of a further embodiment of a fuel injection apparatus for the system of FIG. 1.

Referring to FIG. 7, it is pointed out that a second fuel pump 47', acting parallel to the first fuel pump 47, can be added to provide uninterrupted fuel supply from the fuel injection pump and eliminate the need for the common rail. The structure and operation of the second fuel pump 47' is similar to that for fuel pump 47 and accordingly, the components of fuel pump 47' have been given the same reference numbers, but with a prime notation, as corresponding component of fuel pump 47. Moreover, two pressure intensifiers, connected in a parallel arrangement, with coordinated pressurization of the hydraulic end of the piston allow for uninterrupted pumping action.

The fuel conduction channel and the micro-slots are preferably configured as depressions, arranged at an axial face of the fuel injection ring, the depressions being covered and sealed by a second section of the fuel injection ring, allowing long and very narrow slots for increased atomization. A comparable function can be obtained by forming a thin shim-like layer on a substrate, incorporating the nozzle arrangement in the form of discontinuities formed in the layer between the two parts of the fuel injection ring. The circumferential arrangement of slots/nozzles prevents the concentration of jets of atomized fuel and provides an improved local air/fuel ratio for a more even distribution of fuel over the whole ignition chamber. The assembly of more than one multi channel/micro-slot arrangement allows for differently timed injection or different combustion ingredients.

Figure 8:
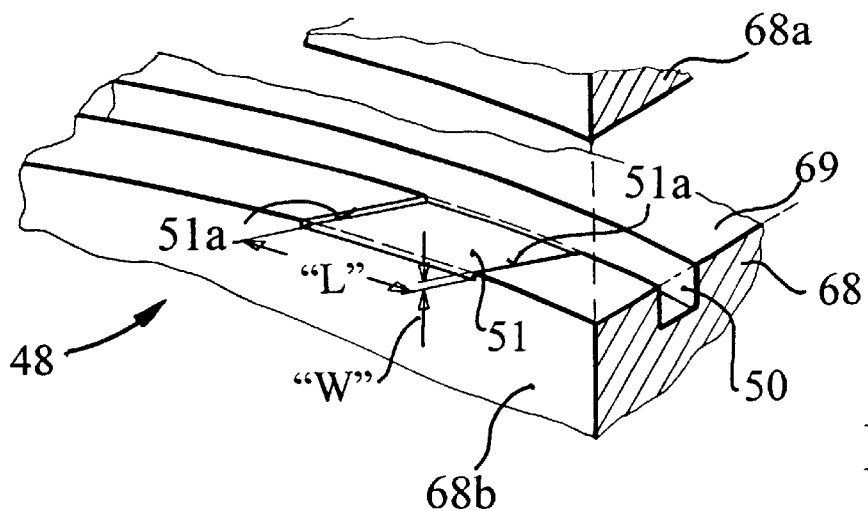
FIG. 8 is an enlarged fragmentary perspective view of one embodiment of a nozzle structure for the fuel injection apparatus shown in FIG. 6.

Referring to FIG. 8, in one preferred embodiment, the nozzle structure 48, only a portion of which is illustrated, comprises a member 68 having an opening 68b (FIG. 6) therethrough. A further member 68a, shown spaced apart from member 68 in FIG. 8, overlies the upper surface 69 of member 68 and can have an opening corresponding to opening 68b of member 68. The members 68 and 68a preferably are generally rectangular or annular plate-like elements, but can be of other shapes and configurations. The inner diameter of the opening 68b can be equal to or smaller or greater than the inner diameter of the bore 3 of the piston. One of the members 68 has an annular fuel conduction channel 50 formed in a surface 69 of the member, defining the fuel conduction channel 50 of the injection nozzle structure 48. Depressions in the surface 69 of the member 68 along one side of the fuel conduction channel 50, form generally rectangular regions, or micro-slots, which define the nozzles 51. The manner in which the micro-slots are formed is dependent upon the material of the member 68, which can be metal, ceramic, or any other suitable material which is somewhat resistant to heat and has a low heat conductivity. The micro-slots can be formed by removing portions of the metal or ceramic material, or by flattening a portion of the surface 69, when made of metal, such as by peening with a suitable tool. The fuel conduction channel and the micro-slots can be sealed by the second member 68a of the nozzle structure. The nozzle structure 48 is positioned between the opposing inner ends of the cylinder housing 2 (FIG. 1) and held together in any suitable manner such as by bonding or otherwise securing the members 68 and 68a together, or by the use of tie rods that extend through openings in the members and which can also maintain together the two sections of the cylinder housing. The micro-slots 51 are disposed in fluid communication with the fuel conduction channel 50. A passageway 70 (FIG. 6) communicates the fuel conduction channel 50 with the outlet of the fuel injection valve 49. In one embodiment, the nozzle structure 48 includes six nozzles 51 (FIG. 6), spaced apart equidistantly along the inner periphery of the element 68. The sides 51a of the nozzle openings 51 extend generally perpendicular to the fuel conduction channel 50 as shown in FIG. 8. The micro-slots are shaped to be long and narrow in cross section so that the shape of the fuel spray provided by the nozzles 51 is substantially flat. This assures that substantially no solid fuel is injected into the combustion chamber 24 through the nozzles 51. In one preferred embodiment, the micro-slots which form the nozzles 51 can have a length "L" to width "W" ratio that is greater than 3 to 1, and preferably about 5 to 1 and higher. Moreover, although the micro-slots are generally rectangular in shape, the nozzle openings 51 can be of other configurations, and have other orientations with respect to the fuel conduction channel 50 or combustion chamber 24.

Figure 9:
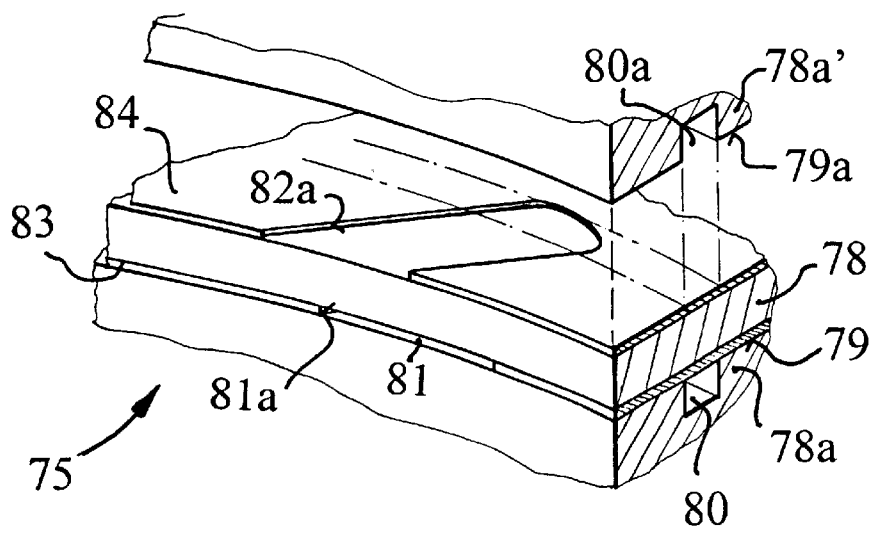
FIG. 9 is an enlarged fragmentary perspective view of another embodiment of a nozzle structure for the fuel injection apparatus shown in FIG. 6.

Referring to FIG. 9, in accordance with a second preferred embodiment, the nozzle structure 75 comprises three members 78, 78a and 78a' having an opening corresponding to opening 68b of nozzle structure 48 (FIG. 6), the inner diameter of the opening being substantially equal to or smaller or greater than the inner diameter of bore 3. The members 78, 78a and 78a' preferably are generally rectangular or annular plate-like members, but can be of other shapes and configurations. Two of the members 78a and 78a' (or a single member 78 provided with two channels 50) can have an annular channel formed in respective surfaces 79 and 79a thereof, defining fuel conduction channels 80 and 80a of the injection nozzle structure 75. The other member 78 is positioned between the members 78a and 78a' engaging the surfaces 79 and 79a. Portions of the surfaces 83 and 84 along one side of the channels 80 and 80a are depressed, forming generally openings 81 and 82 which define the nozzles of the nozzle structure 75. The depressions can be formed in the manner described above for nozzle structure 48, for example. The openings (nozzles) 81 and 82 are disposed in fluid.communication with the channels 80 and 80a, respectively. In one embodiment, the nozzle structures 75 include six nozzles 81 on surface 83, spaced apart equidistantly along the inner periphery of the member 78 and six nozzles 82 on surface 84, spaced apart equidistantly along the inner periphery of the member 78. The sides 81a and 82a of the nozzle openings 81 and 82 the axes of which extend at an angle relative to the channels 80 and 80a. The angle between the channels and the nozzles can be in the range of 30° to 60°, for example. The nozzles 81 and 82 of nozzle structure 75 can have the same length "L" to width "W" ratio(s) as that for nozzle structure 48.

In both of these embodiments, the nozzle structures direct combustion fuel generally radially into the combustion chamber 24. Also, in both embodiments, the fuel conduction channels and the micro-slots are preferably configured as depressions. The depressions are arranged at an axial face of the fuel injection ring, the depressions being covered and sealed by a second section of the injection ring, allowing long and very narrow slots for increased atomization. A comparable function can be obtained by forming a thin shim-like layer on a substrate, incorporating the nozzle arrangement in form of a discontinuities formed in the layer, between the two parts of the fuel injection ring. For example, a very thin layer can be formed on a suitable substrate using known thin film vapor deposition techniques. Alternatively, the fuel conduction channels and/or the microslots forming the nozzles can be formed by chemically etching a substrate.

Figure 10:
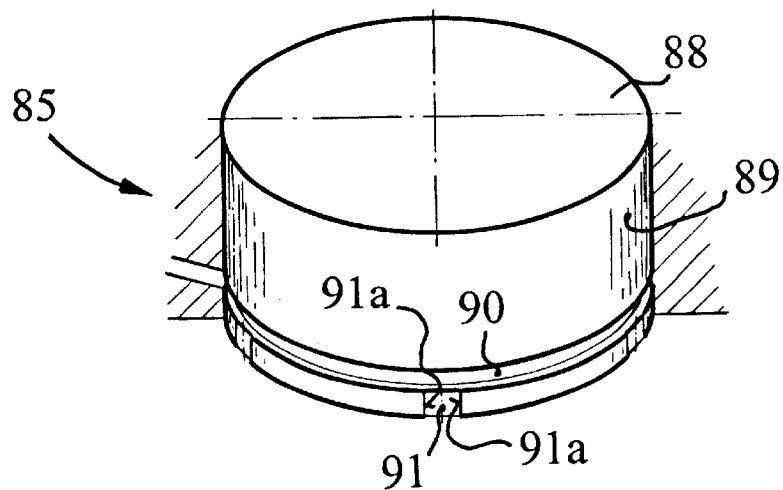
FIG. 10 is an enlarged fragmentary perspective view of a further embodiment of a nozzle structure for the fuel injection apparatus shown in FIG. 6.

The nozzle structures 48 and 75 direct fuel generally radially into a combustion chamber. Referring to FIG. 10, in accordance with a further preferred embodiment of a nozzle structure 85, the nozzles inject jets of combustion fuel into the combustion chamber 24 in generally axial direction. The fuel injection beam pattern can be generally cylindrical or can be somewhat cone-shaped, depending on the orientation of the nozzles. The nozzle structure 85 is preferably used in applications for injecting combustion fuel into a combustion chamber having a single cylinder, such as for example, the free-piston engine illustrated in FIG. 5. In addition, the nozzle structure 85 can be used in conventional engines in addition to free-piston engines. The nozzle structures 48, 75 and 85 can be advantageously used in continuous injection type applications such as in burners for a heating units, jet engines and the like.

The nozzle structure 85 includes a generally annular or cylindrical member 88 having an annular channel formed in an outer surface 89 thereof, defining the fuel connection channel 90 of the injection nozzle structure 85. Portions of the surface 89 along one side of the channel 90 are depressed, forming generally rectangular regions which define the nozzles 91. The rectangular regions are disposed in fluid communication with the channel 90. In one embodiment, the nozzle structure 85 includes six nozzles 91, spaced apart equidistantly along the periphery of the element 88. The sides 91a of the nozzle openings 91 extend generally perpendicular to the channel 90. However, the nozzle openings can be of other configurations and have other orientations with respect to the channel 90. The nozzle structure 85 can be mounted on or in the end wall of the piston chamber.

Alternatively, with suitable modifications, the nozzle structure 85 can be formed on the combustion face of the piston. The nozzles 91 of nozzle structure 85 can have the same length "L" to width "W" ratio(s) as that for nozzle structure 48. The nozzle structures 48, 75 and 85, including the micro-slot nozzles, can be used in the atomization of fluids which are supplied continuously to a utilization device such as a burner for a heater, to a jet engine combustion, and the like, or supplied intermittently to a utilization device, such as a fuel injection device in an internal combustion engine. The fuel pump 47 can be used without the novel nozzle structure 48. Also, the nozzle structures 48, 75 and 85 can be used with a conventional pump. The fuel pump 47 can function as a pressure intensifier or a pressure multiplier. Typical applications include all compressing or pumping applications.

Figure 11:
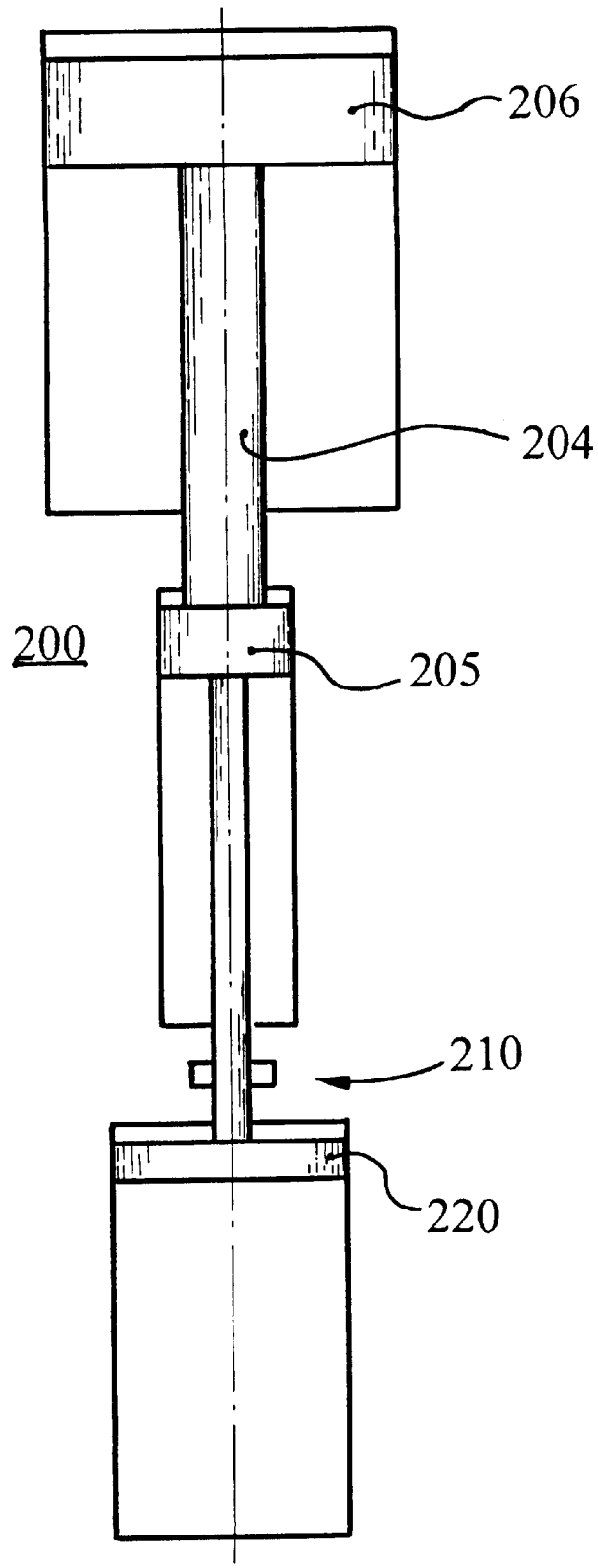
FIG. 11 illustrates a free-piston internal combustion engine in which the hydraulic end of the piston provides the function of a "driver" or piston movement coordinator.

Referring to FIG. 11, a simplified representation of a free-piston internal combustion engine 200 is shown in which the hydraulic end 205 of the piston 204 provides the function of a "driver" or piston movement coordinator. The hydraulic end extracts only energy to maintain its own power needs to cycle the combustion piston. The energy gained during the combustion process is extracted through a "power take-off" function 210, e.g., driving a piston 220 (such as a piston of a pneumatic compressor or a plunger of a water pump, etc.). Alternatively, the power take-off function can drive an electric spool (of an electric generator). In addition to low cost and emissions, and high efficiency, the no wear and no maintenance characteristics of the free-piston engine is very advantageous for such applications.

While preferred embodiments have been illustrated and described, it should be understood that changes and modifications can be made thereto without departing from the invention in its broadest aspects. Various features of the invention are defined in the following claims.

What is claimed is:
1. A fuel injection apparatus comprising:
   a housing including at least one piston bore having a drive end portion and a fuel end portion, the drive end portion being in fluid communication with a source of pressurized fluid, and the fuel end portion being adapted for fluid communication with a source of combustion fuel for charging the fuel end portion with combustion fuel;

a fuel pump piston reciprocably mounted in the piston bore for movement between a top-end position and a bottom-end position for pressurizing combustion fuel in the fuel end portion;

a pressurized fluid drive system coupled to the piston bore for supplying pressurized fluid to the piston bore for driving the fuel pump piston from the top-end position to the bottom-end position;

a nozzle structure for injecting the pressurized combustion fuel into an ignition chamber; and a bias structure for returning the fuel pump piston to the top-end position for recharging the fuel end portion with combustion fuel.

2. The fuel pump as defined in claim 1, wherein the pressurized fluid drive system includes a fluid flow control device for controlling, the supply of pressurized fluid into the first end portion.

3. The fuel pump as defined in claim 1, wherein the housing includes a second piston bore and a further fuel pump piston mounted in the further piston bore for reciprocating movement between top-end and bottom-end positions for supplying pressurized fuel to the nozzle structure in alternate operating cycles with respect to the first mentioned fuel pump piston.

4. The fuel pump as defined in claim 1, further including a first non-return valve for controlling the flow of combustion fuel into the fuel end portion, and a second non-return valve for controlling the flow of pressurized combustion fuel out of the fuel end portion.

5. The fuel pump as defined in claim 1, wherein the nozzle structure includes a member defining the fuel conduction channel and said at least one nozzle, the nozzle being in fluid communication with the fuel conduction channel for directing the pressurized combustion fuel into the ignition chamber, predominantly in a radial direction.

6. The fuel pump as defined in claim 1, wherein the nozzle structure includes at least one member defining a generally annular fuel conduction channel adapted to be placed in fluid communication with a source of combustion fuel, and a nozzle defining at least one nozzle opening, and wherein the length to width ratio of the nozzle opening is at least about three to one.

7. The fuel pump as defined in claim 6, wherein the at least one nozzle communicates the fuel conduction channel with the ignition chamber, predominantly in an axial direction.

8. A nozzle structure for a fuel injector apparatus which supplies combustion fuel to an ignition chamber, the nozzle structure comprising:

an injector member defining a generally annular fuel conduction channel which is adapted to be communicated with a source of combustion fuel, and the injector member having a surface including a depression in fluid communication with the fuel conduction channel; and a cover member overlying the injector member, sealing the fuel conduction channel and the depression, defining at least one nozzle opening, wherein the length to width ratio of the nozzle opening is at least about three to one, wherein the nozzle structure includes only one injector member and only one cover member.

9. The nozzle structure as defined in claim 8, wherein the injector member includes a plurality of depressions defining a plurality of nozzles, the depressions being spaced apart along the periphery of the injector member.

10. The nozzle structure as defined in claim 8, wherein the fuel conduction channel is generally annular in shape and the depression is a micro-slot in fluid communication with the fuel conduction channel for injecting combustion fuel into the ignition chamber, predominantly in an axial direction.

11. The nozzle structure as defined in claim 8, wherein the fuel conduction channel is generally annular in shape and the depression is a micro-slot in fluid communication with the fuel conduction channel for injecting combustion fuel into the ignition chamber, predominantly in a radial direction.

12. The nozzle structure as defined in claim 8, wherein the fuel conduction channel is in said surface of the injector member.

13. A nozzle structure for a fuel injector apparatus which supplies combustion fuel to an ignition chamber, the nozzle structure comprising:

an injector member defining a fuel conduction channel which is adapted to be communicated with a source of combustion fuel, the injector member having a surface including at least one depression along one side of the fuel conduction channel, forming a generally flat region; and a cover member sealing the conduction channel and the depression, the cover member and the depression defining at least one nozzle, wherein the nozzle structure includes only one injector member and only one cover member.

14. The nozzle structure as defined in claim 13, wherein the fuel conduction channel is generally annular in shape.

15. The nozzle structure as defined in claim 13, wherein the length to width ratio of the nozzle opening is at least about three to one.

16. The nozzle structure as defined in claim 13, wherein the fuel conduction channel is in said surface of the injector member.

17. A nozzle structure for a fuel injector apparatus which supplies combustion fuel to an ignition chamber, the nozzle structure comprising:

an injector member having first and second planar surfaces, said injector member including first depressions in said first surface and second depressions in said second surface, forming generally flat regions; and a first cover member having a third planar surface overlying the first planar surface, sealing the first depressions to define a first set of nozzles;

a second cover member having a fourth planar surface overlying the second planar surface, sealing the second depressions to define a second set of nozzles;

one of said first and third surfaces having a first generally annular fuel conduction channel therein, defining a first fuel conduction channel that is in fluid communication with the first set of nozzles, and one of said second and fourth surfaces having a second generally annular fuel conduction channel therein, defining a second fuel conduction channel that is in fluid communication with the second set of nozzles, the first and second fuel conduction channels adapted to be communicated with a source of combustion fuel.

18. The nozzle structure as defined in claim 17, which includes only one injector member, and wherein the first and second fuel conduction channels are in said third and fourth surfaces of the first and second cover members.

19. The nozzle structure as defined in claim 17, wherein the first and second fuel conduction channels are generally annular in shape.

* * * * *